June 2, 1931.  E. J. ZERR  1,807,949
ROTARY DRILL STEM BUSHING
Filed April 29, 1929
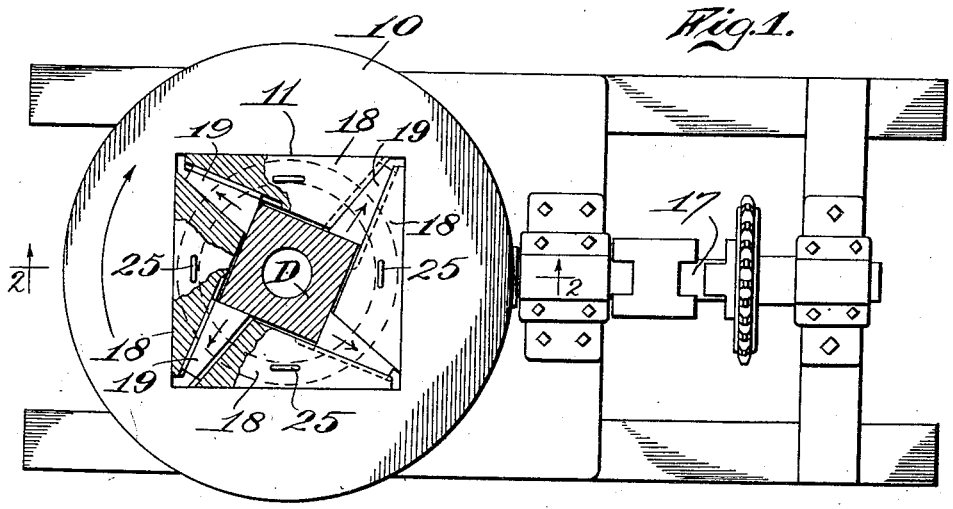
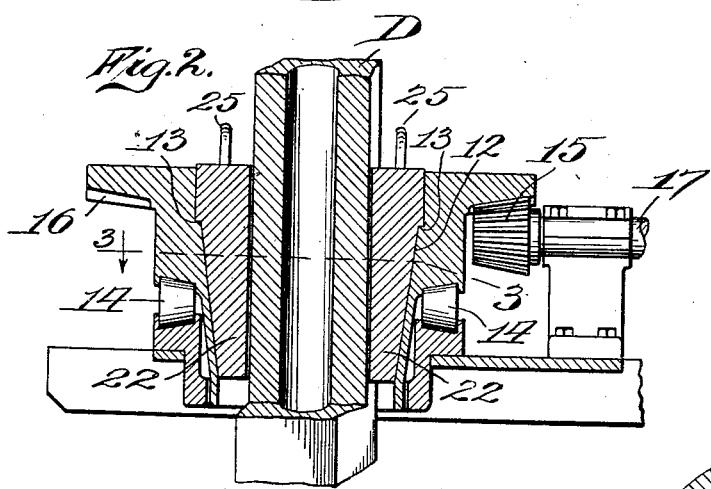
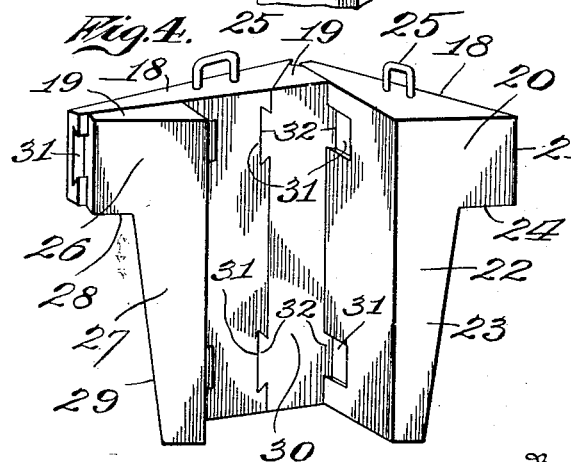
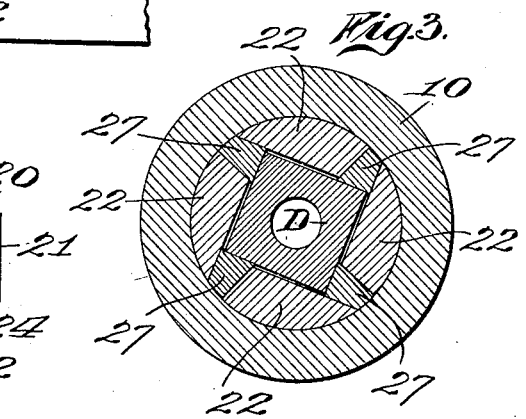
Inventor
Elijah J. Zerr,
By Martin P. Smith
Attorney Patented June 2, 1931

1,807,949

UNITED STATES PATENT OFFICE

ELIJAH J. ZERR, OF GLENDALE, CALIFORNIA

ROTARY DRILL STEM BUSHING

Application filed April 29, 1929. Serial No. 359,161.

My invention relates generally to deep well drilling apparatus and more particularly to a rotary drill stem bushing, and the principal object of my invention is, to provide a strong and substantial connection between the rotary table and the drill stem or kelly bar for imparting rotary movement to the latter and which connection is sectional in construction in order that it may be readily inserted between the rotary table and drill stem and likewise removed from its stem clamping position in order that the drill stem may be readily removed from or inserted through the table during drilling operations.

Further objects of my invention are, to provide a bushing that includes a plurality of wedge blocks that are automatically actuated by strains and stresses produced in operation for very firmly clamping the drill stem to the rotary table, further, to provide a bushing that will equalize the strains developed within the drill stem during the rotation thereof and at the same time eliminate wear on the corners of the drill stem and, further, to provide a drill stem bushing that will be effective in materially reducing the wear upon the bearings and gearing of the rotary table and in addition, effecting a material saving of power required to operate the rotary table and the drill stem that is clamped therein.

With the foregoing and other objects in view, my invention consists in certain novel features of construction and arrangement of parts that will hereinafter be more fully described and claimed and illustrated in the accompanying drawings, in which:

Fig. 1 is a top plan view of a rotary drill table with a drill stem positioned therein and showing my improved bushing partly in section, positioned between the rotary table and drill stem.

Fig. 2 is a vertical longitudinal section taken on the line 2—2 of Fig. 1.

Fig. 3 is a horizontal section taken approximately on the line 3—3 of Fig. 2.

Fig. 4 is a perspective view of the parts of the bushing that constitute one of the halves thereof.

Referring by numerals to the accompanying drawings, which illustrate a practical embodiment of my invention, 10 designates the rotary table of an ordinary deep well drilling rig, which table is provided with a centrally arranged square opening 11 that communicates with the upper end of a tapered circular opening 12, which latter extends downwardly through the depending central portion of the table.

Formed between the upper end of the tapered circular opening 12 and the square opening 11 is a horizontally disposed shoulder 13. The openings 11 and 12 are for the accommodation of the sectional bushing or slips that clamp the drill stem to the rotary table and which drill stem D extends vertically through the center of the opening.

Table 10 is mounted on suitable bearings 14 and is driven in any suitable manner, preferably by means of a bevelled gear pinion 15 that meshes with a circular row of gear teeth 16 on the underside of the marginal portion of the table. Pinion 15 is carried by a power driven shaft 17.

The sectional bushing contemplated by my invention comprises four slips or wedge blocks 18 that are practically identical in size, form and construction and four smaller slips or blocks 19 that are practically identical in size, form and construction.

Each of the larger blocks 18 comprises a horizontally disposed wedge-shaped head 20 having a flat outer face 21 that is adapted to engage one of the straight flat faces of the rectangular opening 11, and depending from the head 20 on the side opposite the flat face 21 is a body 22 that is substantially wedge-shaped in horizontal and vertical section and which has a horizontally curved outer face 23 that is adapted to fit directly against the curved tapered face of the opening 12 in the drill table.

A horizontally disposed shoulder 24 is formed between the head 20 and the wedge-shaped body 22 and which shoulder is adapted to rest on the shoulder 13 that is formed in the rotary table between the square opening 11 and the tapered circular opening 12.

Each slip or bushing member 18 is provided on its upper surface with an upwardly projecting loop or ring 25 that is adapted to receive a hook or the like on suitable hoisting mechanism, thus enabling the slips 18 to be readily raised or lowered while being positioned between the rotary table and drill stem or removed therefrom.

Each of the smaller slips or bushings 19 comprises a horizontally disposed wedge-shaped head 26 and a depending body 27 that is wedge-shaped in horizontal section and which tapers slightly toward its lower end. A horizontally disposed shoulder 28 is formed between the underside of head 26 and depending body 27, which shoulder is adapted to rest on the shoulder 13 in the table and the outer face 29 of the depending body 27 is curved in cross section so as to bear against the curved face of the tapered opening 12.

Each of the smaller slips or bushings 19 is interposed between the narrower end of one of the larger slips or bushings 18 and the adjacent end of the slips or bushing 18 that is disposed at right angles to the first mentioned slip or bushing 18 and each of the narrower slips or bushings 19 is provided with a straight flat inner face 30 that is adapted to engage directly against the corresponding straight flat face of the drill stem D and which latter it will be understood is square in cross section.

Formed in the faces of the larger slips or bushings 18 against which the side faces of the wedge-shaped bushings 19 engage are horizontally disposed dovetail slots or recesses 31 and arranged for sliding movement therein are horizontally disposed dovetail ribs 32 that are formed on the side faces of the slips or bushings 19.

In order to permit the slips or bushing members to be readily inserted between the table and drill stem or removed therefrom, the dovetailed rib and slot connections between an oppositely disposed pair of the slips 19 and the adjacent end faces of an oppositely disposed pair of the slips or bushing members 18 are eliminated, and thus one-half of the bushing comprising a pair of members 18 and a pair of members 19, as shown in Fig. 4 may be readily moved vertically relative to the other half of the bushing and which latter comprises a pair of the members 18 and a pair of the members 19.

When assembled for use the various members of the sectional bushing are assembled in the openings 11 and 12 in the rotary table, as illustrated in Figs. 1 and 2, with the shoulders 24 and 28 resting upon the shoulder 13 and, due to the horizontal wedge-shape of the bodies of the slips, a substantial square opening is formed between the slips, which opening is for the accommodation of the square drill stem or kelly bar D.

The faces of this square opening for the drill stem occupy inclined or angular positions relative to the straight faces of the opening 11 and which arrangement is due to the wedge-shape of the assembled pairs of slips, each of said pairs comprising a slip or bushing member 18 and slip or bushing member 19.

After the drill stem is inserted through the openings 11 and 12 and the sectional bushing has been assembled within said opening between the drill stem and table, the latter is rotated in the direction indicated by the arrow in Fig. 1 by application of power to shaft 17 and the pinion 15 on the end of said shaft engaging with the teeth 16, rotates said table.

Inasmuch as the assembled slips or bushing members provide a direct connection between the rotary table and the drill stem, the latter will be rotated with the table as the latter rotates.

The weight of the drill stem and the drill line carried thereby and the resistance offered to the drill in the formation at the bottom of the well will obviously produce in the drill stem a considerable degree of resistance to the rotary motion that is imparted thereto by the rotary table and this resistance of the drill stem will be impressed directly on the base or inner faces 30 of the smaller slips 19 and the force of such resistance tends to move said members outwardly and said members acting as wedges between the adjacent ends of the adjacent slips or bushing members 18 will force the same outwardly against the faces of the openings 11 and 12, thereby to a certain degree expending the sectional bushing so that a practically solid bearing is formed between the rotary table and the drill stem.

The outward movement of the slips or bushing members 19, due to the resistance offered by the drill stem and drill line during operations, is indicated by the arrows appearing on said members 19 in Fig. 1.

When it becomes necessary to loosen the bushing to permit the drill stem to become raised or lowered or for the purpose of removing the bushing, it is only necessary to rotate the table a short distance in the reverse direction, and such action shifts the blocks 19 outwardly a slight distance or such a degree as to relieve the resistance to twisting strains between the stem and bushing members 19 and with the parts so positioned the stem may be readily raised or lowered, and the parts of the bushing removed from the table.

A rotary drill table bushing of my improved construction is capable of being readily assembled or taken apart, it provides a firm and substantial connection between the table and drill stem, it equalizes strains on the drill stem while the same is being rotated and as the base faces of the bushing members 19 engage directly against the flat faces of the drill stem, the wearing and rounding off of the corners of the drill stem is entirely eliminated.

Thus it will be seen that I have provided a rotary drill stem bushing that is relatively simple in construction, inexpensive of manufacture and very effective in performing the functions for which it is intended.

It will be understood that minor changes in the size, form and construction of the various parts of my improved rotary drill stem bushing may be made and substituted for these herein shown and described without departing from the spirit of my invention, the scope of which is set forth in the appended claims.

I claim as my invention:

1. A rotary drill stem bushing, comprising a plurality of pairs of members that are wedge-shape in horizontal section and horizontally disposed rib and groove connections between the members of each pair of wedge shaped members.

2. A rotary drill stem bushing, comprising a plurality of pairs of members that are wedge-shape in horizontal section and interengaging connections between said members for permitting independent lateral sliding movement of said slips when the same are assembled for use.

3. In a rotary drill stem bushing, a series of four members that are wedge-shape in horizontal section and a series of four smaller bushing members arranged between the ends of the first mentioned series of members, which small members are wedge-shape in horizontal section and all of which members are capable of independent sliding movement.

4. In a rotary drill stem bushing, a series of four members that are wedge-shape in horizontal section, a series of smaller bushing members arranged between the ends of the first mentioned series of members, which small members are wedge-shape in horizontal section and inter-engaging connections between the two sets of members to permit relative horizontal sliding movement.

5. In a rotary drill stem bushing, a series of bushing members that are wedge-shape in horizontal section and which are provided with externally arranged rotary table engaging faces wedge-shaped bushing members arranged between the end portions of said first mentioned members and interengaging sliding connections between all of said bushing members.

6. The combination with a rotary drill table, provided with an opening for the accommodation of a drill stem, of a bushing removably arranged within the opening in said table for engaging the drill stem passing therethrough, which bushing comprises a plurality of table engaging members that are wedge-shape in horizontal section a plurality of drill stem engaging members that are wedge-shape in horizontal section and interengaging sliding connections between all of said bushing members.

7. The combination with a rotary drill table, provided with an opening for the accommodation of a drill stem, of a bushing removably arranged within the opening in said table for engaging the drill stem passing therethrough, which bushing comprises a plurality of table engaging members that are wedge-shape in horizontal section, a plurality of drill stem engaging members that are wedge-shape in cross section and inter-engaging connections between the bushing members, to permit independent horizontal sliding movement.

8. The combination with a rotary drill table, provided with an opening for the accommodation of a drill stem, of a plurality of pairs of bushing members arranged in the opening in the drill table, the members of each pair of bushing members being of different sizes, both members being wedge-shape in horizontal section and interengaging sliding connections between said bushing members for permitting independent horizontal sliding movement.

9. The combination with a rotary drill table, provided with an opening for the accommodation of a drill stem, of a plurality of pairs of bushing members arranged in the opening in the drill table, the members of each pair of bushing members being of different sizes, both members being wedge-shape in horizontal section and one member of each pair bearing against the drill table the other member of each pair bearing against the drill stem and interengaging sliding connections between said bushing members.

10. The combination with a rotary drill table, provided with an opening for the accommodation of a drill stem, of a bushing removably arranged within the opening in said table for engaging the drill stem passing therethrough, which bushing comprises co-operating pairs of wedge-shaped members assembled to form between them a substantially square drill stem receiving opening and interengaging sliding connections between said bushing members.

In testimony whereof I affix my signature.

ELIJAH J. ZERR.